United States Patent [19]
Jandrasi et al.

[11] Patent Number: 4,512,363
[45] Date of Patent: Apr. 23, 1985

[54] SLIDE VALVE

[75] Inventors: Frank J. Jandrasi; Davy G. Pampell; Walter J. Stinson, all of Houston, Tex.

[73] Assignee: General Signal Corporation, Stamford, Conn.

[21] Appl. No.: 411,407

[22] Filed: Aug. 25, 1982

[51] Int. Cl.³ .............................................. F16L 7/00
[52] U.S. Cl. .................................... 137/375; 251/328; 251/361
[58] Field of Search .............. 137/375; 251/328, 329, 251/360, 361

[56] References Cited

U.S. PATENT DOCUMENTS

| | | | |
|---|---|---|---|
| 2,696,967 | 12/1954 | Wilson et al. | 251/360 |
| 2,787,438 | 4/1957 | Bauer | 137/375 |
| 3,722,857 | 3/1973 | Townsend | 251/328 |
| 3,964,507 | 6/1976 | Jandrasi et al. | 137/375 |
| 4,458,879 | 7/1984 | Jandrasi | 251/326 |

Primary Examiner—A. Michael Chambers
Assistant Examiner—Sheri Novack
Attorney, Agent, or Firm—Martin LuKacher

[57] ABSTRACT

Disclosed is a slide valve in which the valve internals, the valve seat, guides and slide valve are maintained in position by a clamping action of an abutment in the valve body and on the valve liner secured in the body by a quick make-up connection. The slide valve is suited for all sizes of valves, both large and small and no screws or other fasteners are needed to maintain the valve internals in position. Advantageously, the guides and slides of the slide valve are maintained out of the flow path, and the valve internals including the orifice assembly with its valve seat and guides, and slide valve with its slides are readily removable through the bonnet area.

15 Claims, 4 Drawing Figures

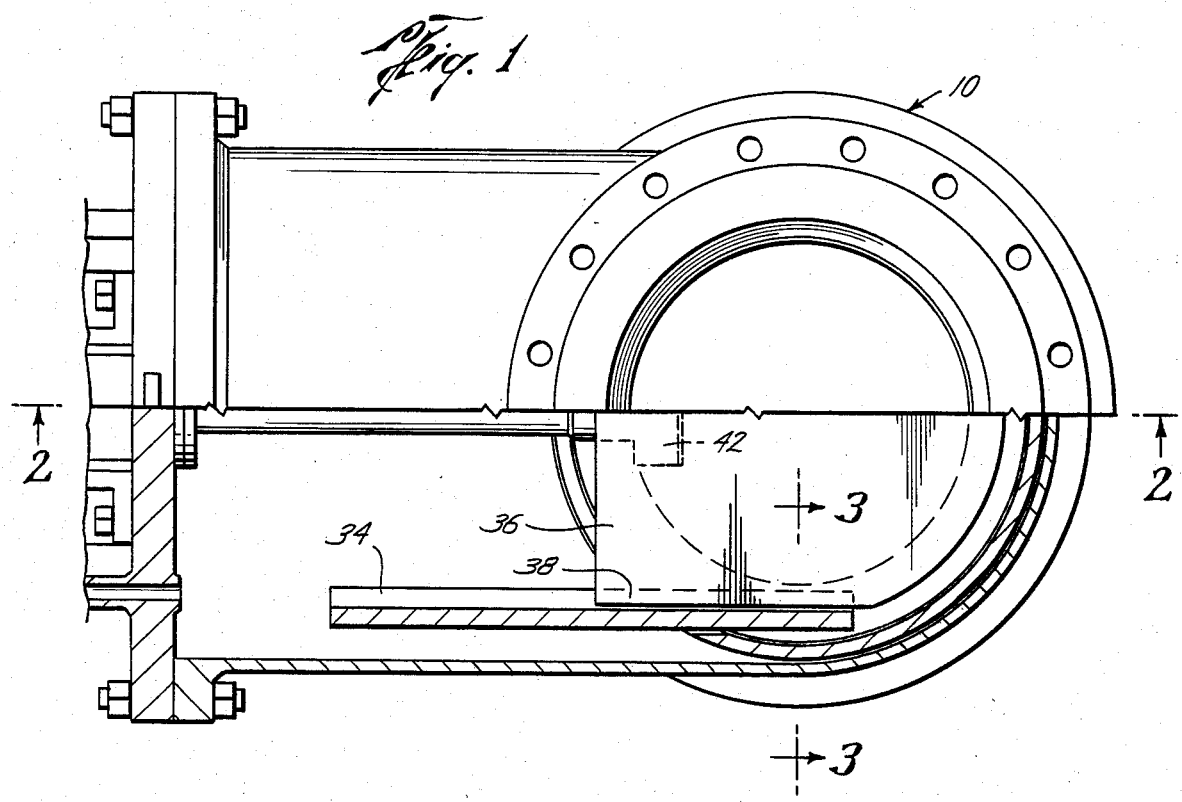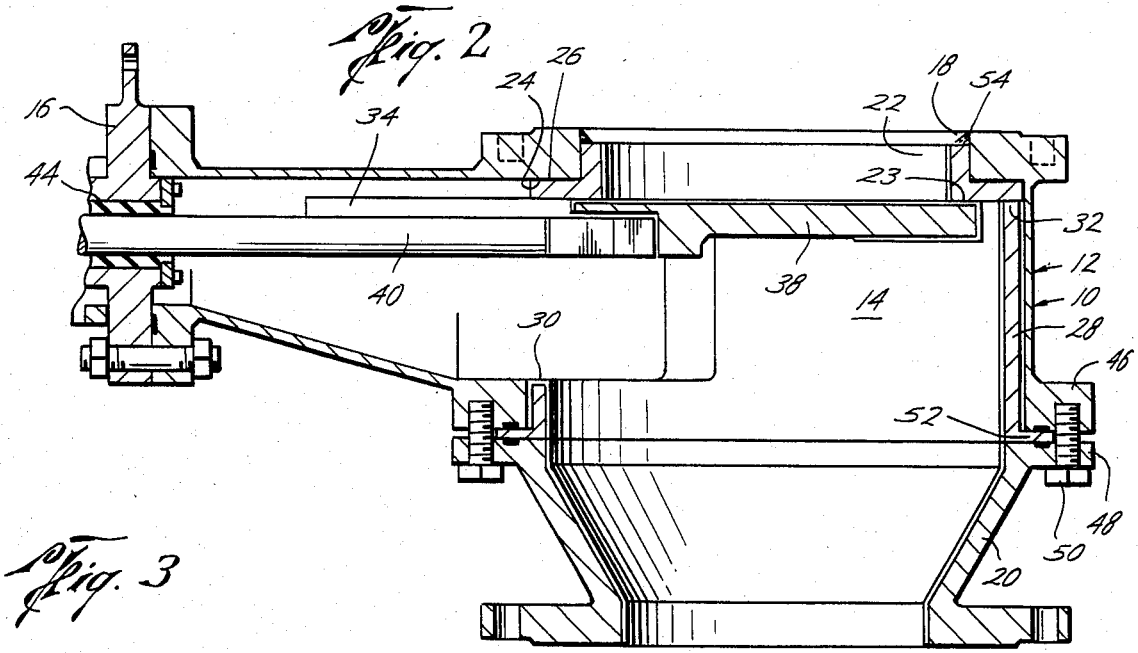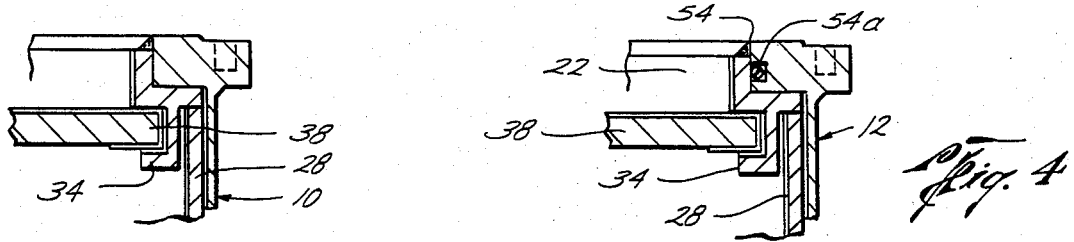

SLIDE VALVE

BACKGROUND OF THE INVENTION

1. Field of the Invention

The field of the invention is slide or disc valves.

2. Prior Art

The inventor is not aware of any prior art in which the orifice assembly having a valve seat and attached or integral guides for the slides of the slide valve or disc is maintained in position in the valve body by a clamping action between an abutment in the body and an abutment on the liner of the valve, such as coacting shoulders.

The following U.S. patents are representative of patents disclosing slide or disc valves: U.S. Pat. No. 2,787,438 in which the guide members 25 are bolted to the valve body on either side of the opening; U.S. Pat. Nos. 3,511,261 and 3,726,306 in which the valve internals are bolted to the body; and U.S. Pat. No. 3,279,002 which merely illustrates the use of a ceramic lining in a mold shut-off arrangement.

SUMMARY

It would be highly desirable and the present invention is directed to a slide valve in which the valve internals are maintained in place by a clamping action between an abutment in the body, and an abutment on the liner of the valve, such as coacting shoulders. Preferably, the liner is connected in the valve body by a quick make-up connection. Advantageously, the bonnet area is of a size sufficient to permit the valve internals, that is the orifice assembly including the valve seat and guides, and the slide valve with its slides to be inserted into and removed from the valve body through the bonnet area, which is closed by a removable closure. The valve may be suitably lined with abrasive resistant or hardfacing material or a ceramic material to withstand the conditions of use. Further details and aspects of the valve of the present invention are set forth in the following description of preferred embodiments.

Accordingly, it is an object of the present invention to provide a slide valve in which the valve internals are maintained in position in the body by a clamping action between abutments in the body and on the liner.

It is a further object of the present invention to provide such a slide valve which is well suited and adapted to be made in very small as well as very large sizes and in which it is not necessary to use bolts, screws or other fasteners for securing the valve internals in position.

A further object of the present invention is the provision of such a slide valve which is particularly suitable for use in controlling flow of slurries as well as other abrasive and erosive flows.

A further object of the present invention is the provision of such a slide valve which may be assembled and disassembled quickly and readily and in which the valve internals can be removed through the bonnet area for repair and replacement.

Other and further objects, features and advantages are inherent in the slide valve as set forth throughout the specification and claims.

BRIEF DESCRIPTION OF THE DRAWING

FIG. 1 is a plan view with a quarter section broken away illustrating a slide valve according to the invention.

FIG. 2 is a sectional view taken the line 2—2 of FIG. 1.

FIG. 3 is a partial sectional view taken along the line 3—3 of FIG. 1.

FIG. 4 is a view similar to that of FIG. 3 illustrating a modification according to the invention.

Referring now to the drawing, and particularly to FIGS. 1 and 2, the slide valve is generally designated by the reference numeral 10 and has the body 12 which has an internal chamber 14 releasably closed by the cover or bonnet 16. The body 12 has an inlet 18 and has the outlet 20, both of which are in fluid communication with the internal chamber 14 and form a flow path through the body 10.

A tubular orifice assembly 22 provided with a valve seat 23 and an outwardly extending abutment, such as the circumferential flange 24, is disposed in the body 10, the flange 24 extending outwardly a distance sufficient to abut against the internal shoulder 26 of the body 10. The shoulder 26 serves as an abutment restraining movement of the orifice plate 22 in the direction of the abutment. Any suitable abutments, however, can be used to restrain movement of the orifice assembly 22 in the body 12, for example, a shoulder disposed in the inlet 18 or coacting projections on the orifice and in the body, not shown.

Removably disposed in the body 10 is the liner 28 which has a recessed portion 30 through which the valve internals, as subsequently described, can be inserted, operated and removed.

The end 32 of the unrecessed portion of the liner 28 serves as an abutment which coacts with and abuts against the abutment flange 24 thereby clamping the orifice assembly 22 against the abutment 26 and thereby effectively maintaining the orifice assembly 22 in position as illustrated. While the abutment of the end 32 with the flange 24 of the orifice plate 22 is preferred because of its simplicity, if desired, other forms of coacting abutments can be used, for example, a shoulder not shown, placed on the liner 28 which engages the abutment flange 24 of the orifice assembly 22, can be utilized, it only being necessary that the orifice assembly 22 be clamped into position by the action of the liner 28 and a suitable abutment in the body 10 such as the shoulder 26.

A pair of spaced apart guides 34, only one being shown, are carried by the orifice assembly 22. The guides 34 can be of any desired shape, here shown as L-shaped in cross-section. Preferably, the guides 34 are formed integrally with the orifice assembly 22, or they can be bolted or otherwise secured to the orifice assembly 22. Advantageously, the guides 34 are disposed out of and beyond the flow path to avoid wear by the flow through the valve.

A slide valve 36 provided with the slides 38, which may be ends of the slide valve or disc 36 are of any desired shape, slide in the guides 34 thereby guiding the slide valve 38 into open, partially closed and closed positions with respect to the valve seat 23 which is engaged by the disc or slide 38 for this purpose.

An actuator rod 40 is releasably secured to the slide valve 38, such as by the T-connection 42, which actuator rod 40 extends through the stuffing box generally designated by the reference numeral 44. No detailed description is given of the stuffing box 44 as any desired or conventional stuffing box can be used, many of which are readily available. The actuator rod 40 may be actuated manually, hydraulically, pneumatically or mechanically by any desired and suitable means, not shown, which are readily available.

The body 10 is here shown as made up of two parts, the outlet 20, here shown as being cone-shaped and the body member 12. The body member 12 has the outwardly extending annular flange 46 and the body outlet 20 has the coacting outwardly extending annular flange 48, which flanges are secured together by means of the bolts 50 or other suitable connecting means.

The liner 28 has the outwardly extending annular flange 52 which is disposed between the annular flanges 46 and 48. Thus, when the body 10 and the outlet 20 are secured together by the bolts 50 the liner 28 is secured in position which, in turn, due to the clamping action previously described secures and maintains the orifice assembly 22 with its valve seat 23 and guides 34 in position.

Suitable connecting means are provided and are illustrated for connecting the valve 10 to a conduit, pipe or other flow lines in which the valve is to be used. Any desired connecting means can be used.

The valve includes suitable seals, as illustrated in the drawing. In FIGS. 1, 2 and 3, a seal weld 54 is utilized to seal the orifice assembly 22 in the body member 12 and, as illustrated in FIG. 4, an O-ring 54a is substituted for the seal weld 54. Any type of sealing arrangement, however, can be utilized to seal the various components of the valve to avoid leakage. Accordingly, no further description thereof is deemed necessary or given.

As illustrated, the valve 10 can be suitably lined with a hardfacing lining or a refractory material to withstand the conditions of use. Since such hardfacing materials and refractory materials are readily available on the market, no description of these materials is deemed necessary or given.

To assemble the slide valve 10, with the bonnet or cover 16 removed, the orifice assembly 22 with the valve seat 23 and the guides 34 is inserted into the internal chamber 14 through the bonnet area and positioned against the internal shoulder 26. The liner 28 is then placed into position, as illustrated, and the outlet 20 is then bolted to the body 12 thus maintaining the liner 28 and the orifice assembly 22 with its valve seat 23 and carried guides 34 in position. The slide valve 38 may then be placed into position in the slides 34 preferably with the actuator stem 40 attached and the bonnet cover 16 is then bolted or otherwise secured to the body 12. The actuator arm or rod 40 is then ready to be actuated by any suitable means.

To disassemble the slide valve 10 for maintenance, repair or replacement of parts, the bonnet or removable cover 16 is removed and the actuator rod and slide valve are removed through the bonnet area. The outlet 20 is removed from the body 12 and the liner is then removed at the end of the body where it is connected to the outlet 20. This frees the orifice assembly 22 which can then be removed along with the guides 34 and the valve seat 23. If desired, of course, the actuator rod and slide valve can be removed at the same time the orifice plate is removed, but in this event the liner 28 would need to be removed first. Suitable maintenance, repairs and replacement of parts can then be accomplished and the valve reassembled as described.

Any desired sequence of inserting and removing the valve internals can be used.

In the event a seal weld 54 is utilized as illustrated in FIGS. 2 and 3, the seal weld would be applied when assembling the valve internals in the valve 10 and it would be broken when removing the internals. In the event the O-ring 54a is used in lieu of the seal weld 54, as illustrated in FIG. 4, the internals can simply be removed without breaking any type of a weld seal.

It is noted that all of the valve internals are securely maintained in operating position by means of clamping the orifice assembly 22 between suitable abutments in the body and on the liner. The orifice assembly in turn maintains the guides 34 in position, which in turn maintains the slide valve 38 in operating position by virtue of the coacting guides 34 and slides 38. This is highly advantageous particularly when the slide valve is used in corrosive or erosive flows where parts have to be replaced or repaired due to the flow.

Accordingly, the present invention is well suited and adapted to attain the objects and ends and has the advantages and features mentioned as well as others inherent therein.

While presently preferred embodiments of the invention have been given for the purpose of disclosure, changes can be made therein which are within the spirit of the invention as defined by the scope of the appended claims.

What is claimed is:

1. A valve comprising, a body having an internal chamber and an inlet and outlet in fluid communication with the internal chamber for forming a flow passage through the body, a valve seat having an orifice disposed in the body about the flow passage, an abutment in the body, a tubular liner radially spaced from said orifice and disposed adjacent to the wall of said chamber and separate from the valve seat and having an abutment, said liner being removably disposed in the body, said liner abutment and said body abutment bearing against portions of said valve seat on opposite sides thereof, the valve seat being maintained in position by a clamping action of the abutments against said portions, spaced apart guides maintained in position with the valve seat, a slide valve having slides slidable in the guides operable for movement of the slide valve across the orifice into open, partially closed and closed positions, and means to move the slide valve into its positions.

2. A valve comprising, a body having an internal chamber and an inlet and an outlet in fluid communication with the internal chamber and forming a flow passage to the body, a shoulder in the body disposed about the flow passage, an orifice assembly provided with a valve seat presenting a seating surface facing said outlet and an outwardly extending annular flange disposed in the body, a first surface which faces said outlet and on one side of the annular flange abutting against the shoulder, a liner removably disposed in the body, a portion of the liner engaged against a second surface of the annular flange on the side thereof opposite to said one side of the first surface thereby maintaining the orifice assembly in position in the body by a clamping action of the shoulder and the liner against said first and second opposite side surfaces of said annular flange, spaced apart guides carried by the orifice assembly and disposed on opposite sides of the flow passage, a slide valve having slides slidable in the guides operable for movement of the slide valve into open, partially closed and closed positions, and means to move the slide valve into its positions.

3. The slide valve of claim 1 where, the guides are integral in a one-piece assembly with the valve seat.

4. The slide valve of claim 2 where, the guides are integral in a one-piece assembly with the orifice assembly.

5. The valve of claim 1 where,
the internal chamber has an opening of a size sufficient to permit insertion and removal of the valve seat, guides and slide valve, and
a bonnet releasably secured to the body closing the opening.

6. The valve of claim 2 where,
the internal chamber has an opening of a size sufficient to permit insertion and removal of the orifice assembly, guides and the slide valve, and
a bonnet releasably secured to the body closing the opening.

7. The slide valve of claims 1 or 2 where,
the outlet is cone shaped.

8. A slide valve comprising,
a body having an internal chamber and an inlet in fluid communication with the internal chamber,
an outlet in fluid communication with the internal chamber whereby a flow passage is formed by the inlet, the internal chamber and the outlet,
the body comprised of at least two parts having coacting outwardly extending flanges and means removably securing the flanges together,
an internally facing annular shoulder in the body adjacent the inlet,
an orifice assembly disposed adjacent the inlet, the orifice assembly being provided with a valve seat disposed about the flow passage and an outwardly extending flange having a first surface abutting against the internal shoulder,
a liner disposed in the body, the liner having an externally extending flange disposed between the coacting flanges of the parts of the body thereby removably securing the liner in the body,
a portion of the inlet end of the liner abutting against a second surface of the flange of the orifice assembly opposite to that of the first surface effective to clamp the orifice assembly in position,
spaced apart guides disposed beyond the flow passage carried by the orifice assembly,
a slide valve having slides slidable in the guides operable for movement of the slide valve into open, partially closed and closed positions, and
means to move the slide valve into its positions.

9. The valve of claim 8 where,
the internal chamber has an opening of a size sufficient to permit insertion and removal of the orifice assembly, guides and the slide valve, and
a bonnet releasably secured to the body closing the opening.

10. The slide valve of claim 8 where,
the guides are integral with the orifice assembly.

11. The slide valve of claim 8 where,
the guides and the valve seat are integral with the orifice assembly.

12. An orifice assembly for a slide valve having a body, a flow passage through the body, an abutment about the flow passage, and a slide valve having slides, the orifice assembly comprising,
a valve seat with an outwardly-extending abutment and guides coacting with the slides, the abutment on the orifice assembly engaging the abutment in the body.

13. The orifice assembly of claim 12 wherein,
the orifice assembly including the guides is integral in a one-piece assembly.

14. A valve comprising, a body having an internal chamber and an outlet in fluid communication with the internal chamber and forming a flow passage through the body, a valve seat disposed in the body about the flow passage, an abutment in the body, the body having at least two parts having outwardly extending flanges releasably secured together, a liner separate from the valve seat and having an abutment, the liner being removably disposed in the body, the liner having an outwardly extending flange disposed in between the flanges of each of the body parts thereby removably disposing the liner in the body, said liner abutment and said body abutment bearing against portions on opposite sides of said valve seat, the valve seat being maintained in position by a clamping action of the abutments against said portions on opposite sides of said valve seat, spaced apart guides maintained in position with the valve seat, a slide valve having slides slidable in the guides operable for movement of the slide valve into open, partially closed and closed positions, and means to move the slide valve into its positions.

15. A valve comprising, a body having an internal chamber and inlet and an outlet in fluid communication with the internal chamber and forming a flow passage through the body, a shoulder in the body disposed about the flow passage, an orifice assembly provided with a valve seat and an outwardly extending annular flange disposed in the body, the body having at least two parts having outwardly extending flanges releasably secured together, a liner removably disposed in the body, said liner having an outwardly extending flange disposed between the flanges of each of the body parts thereby removably disposing the liner in the body, a portion of the liner engaged against the second surface of the annular flange on the side thereof opposite to said one side of the first surface thereby maintaining the orifice assembly in position in the body by a clamping action of the shoulder and the liner against said first and second opposite side surfaces of said annular flange, spaced apart guides carried by the orifice assembly and disposed on opposite sides of the flow passage, a slide valve having slides slidable in the guides operable for movement of the slide valve into open, partially closed and closed positions, and means to move the slide valve into its positions.

* * * * *